(12) United States Patent
Rendahl et al.

(10) Patent No.: US 12,175,409 B2
(45) Date of Patent: Dec. 24, 2024

(54) INTELLIGENT REUSABLE PACKAGING AMELIORATION FOR COGNITIVE SHIPMENTS

(71) Applicant: INTERNATIONAL BUSINESS MACHINES CORPORATION, Armonk, NY (US)

(72) Inventors: Randy A. Rendahl, Raleigh, NC (US); Jeremy R. Fox, Georgetown, TX (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 18/056,293

(22) Filed: Nov. 17, 2022

(65) Prior Publication Data

US 2024/0169305 A1 May 23, 2024

(51) Int. Cl.
*G06Q 10/08* (2024.01)
*B65B 25/02* (2006.01)
(Continued)

(52) U.S. Cl.
CPC ...... *G06Q 10/0832* (2013.01); *B65B 2210/04* (2013.01)

(58) Field of Classification Search
CPC .................. G06Q 10/0832; B65B 2210/04
(Continued)

(56) References Cited

U.S. PATENT DOCUMENTS

| 8,745,960 B2 | 6/2014 | Kannankeril |
| 8,936,156 B1 | 1/2015 | Tschantz |

(Continued)

FOREIGN PATENT DOCUMENTS

| CN | 1656490 A | 8/2005 |
| CN | 202265048 U | 6/2012 |

(Continued)

OTHER PUBLICATIONS

IBM, "IBM Sterling Solutions", IBM, [Accessed on Jul. 12, 2022], 13 Pages. https://www.ibm.com/supply-chain/sterling.

(Continued)

*Primary Examiner* — Robert F Long
*Assistant Examiner* — Xavier A Madison
(74) *Attorney, Agent, or Firm* — Robert R. Aragona

(57) ABSTRACT

An embodiment for ameliorating reusable packaging for cognitive commerce shipments is provided. The embodiment may include receiving information relating to a product to be shipped in a reusable package and historical sensor data obtained from a knowledge corpus. The embodiment may also include predicting a size of the reusable package in which to ship the product. The embodiment may further include identifying a required level of inflation of an array of balloons in the reusable package. The embodiment may also include inflating a plurality of balloons in the array of balloons consistent with the required level of inflation. The embodiment may further include in response to determining the product does not require additional protection, deflating each inflated balloon in the array of balloons upon delivery of the product to the final destination.

20 Claims, 4 Drawing Sheets

(51) Int. Cl.
  *B65D 81/05* (2006.01)
  *G05D 16/00* (2006.01)
  *G06Q 10/0832* (2023.01)
(58) Field of Classification Search
  USPC .......................................................... 53/472
  See application file for complete search history.

(56) References Cited

U.S. PATENT DOCUMENTS

| | | | |
|---|---|---|---|
| 10,793,336 B2 | 10/2020 | Zhang | |
| 2013/0205724 A1* | 8/2013 | Straver | B65B 67/02 |
| | | | 53/238 |
| 2014/0224699 A1 | 8/2014 | Smith | |
| 2020/0039722 A1 | 2/2020 | Rabinovich | |
| 2021/0171263 A1 | 6/2021 | Martin | |
| 2022/0002016 A1* | 1/2022 | Bellman | B65B 31/04 |
| 2022/0041364 A1 | 2/2022 | Lester | |

FOREIGN PATENT DOCUMENTS

| | | |
|---|---|---|
| CN | 106697578 A | 5/2017 |
| CN | 206704799 U | 12/2017 |
| CN | 207174435 U | 4/2018 |
| CN | 207725994 U | 8/2018 |
| CN | 108974644 A | 12/2018 |
| CN | 110844255 A | 2/2020 |
| CN | 114633887 A | 6/2022 |
| CN | 114897463 A | 8/2022 |
| KR | 20150130271 A | 11/2015 |
| WO | 2015192707 A1 | 12/2015 |
| WO | 2021227799 A1 | 11/2021 |

OTHER PUBLICATIONS

Miller, "IBM-Maersk blockchain shipping consortium expands to include other major shipping companies", TechCrunch, May 28, 2019, 10 Pages. https://techcrunch.com/2019/05/28/ibm-maersk-blockchain-shipping-consortium-expands-to-include-other-major-shipping-companies/.

Wolfson, "Global shipping leaders join IBM and Maersk blockchain platform", Cointelegraph, Oct. 15, 2020, 5 Pages. https://cointelegraph.com/news/global-shipping-leaders-join-ibm-and-maersk-blockchain-platform.

International Searching Authority, "Notification of Transmittal of the international Search Report and the Written Opinion of the International Searching Authority, or Declaration," Patent Cooperation Treaty, Dec. 21, 2023, 9 pages, International Application No. PCT/CN2023/130037.

* cited by examiner

INTELLIGENT REUSABLE PACKAGING AMELIORATION FOR COGNITIVE SHIPMENTS

BACKGROUND

The present invention relates generally to the field of computing, and more particularly to a system for ameliorating reusable packaging for cognitive commerce shipments.

In the current marketplace, products are delivered with appropriate packages. For example, a larger product may require a larger box than a box required for a smaller product. These products may be delivered by trucks, vans, ships, trains, and/or airplanes. Many of these products may be delivered in reusable packages, where the reusable packages are collected after the products have been delivered. Alternatively, the recipient may reuse the delivered package to either return an unwanted or defective product or ship a completely different product. As technology continues to improve and give consumers the ability to have products shipped to their homes at the click of a button, the demand for reusable packages is expected to increase in the coming decades.

SUMMARY

According to one embodiment, a method, computer system, and computer program product for ameliorating reusable packaging for cognitive commerce shipments is provided. The embodiment may include receiving information relating to a product to be shipped in a reusable package and historical sensor data obtained from a knowledge corpus. The embodiment may also include predicting a size of the reusable package in which to ship the product based on the information. The embodiment may further include identifying a required level of inflation of an array of balloons in the reusable package based on the information and the historical sensor data. The embodiment may also include inflating a plurality of balloons in the array of balloons consistent with the required level of inflation. The embodiment may further include in response to determining the product does not require additional protection, deflating each inflated balloon in the array of balloons upon delivery of the product to the final destination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
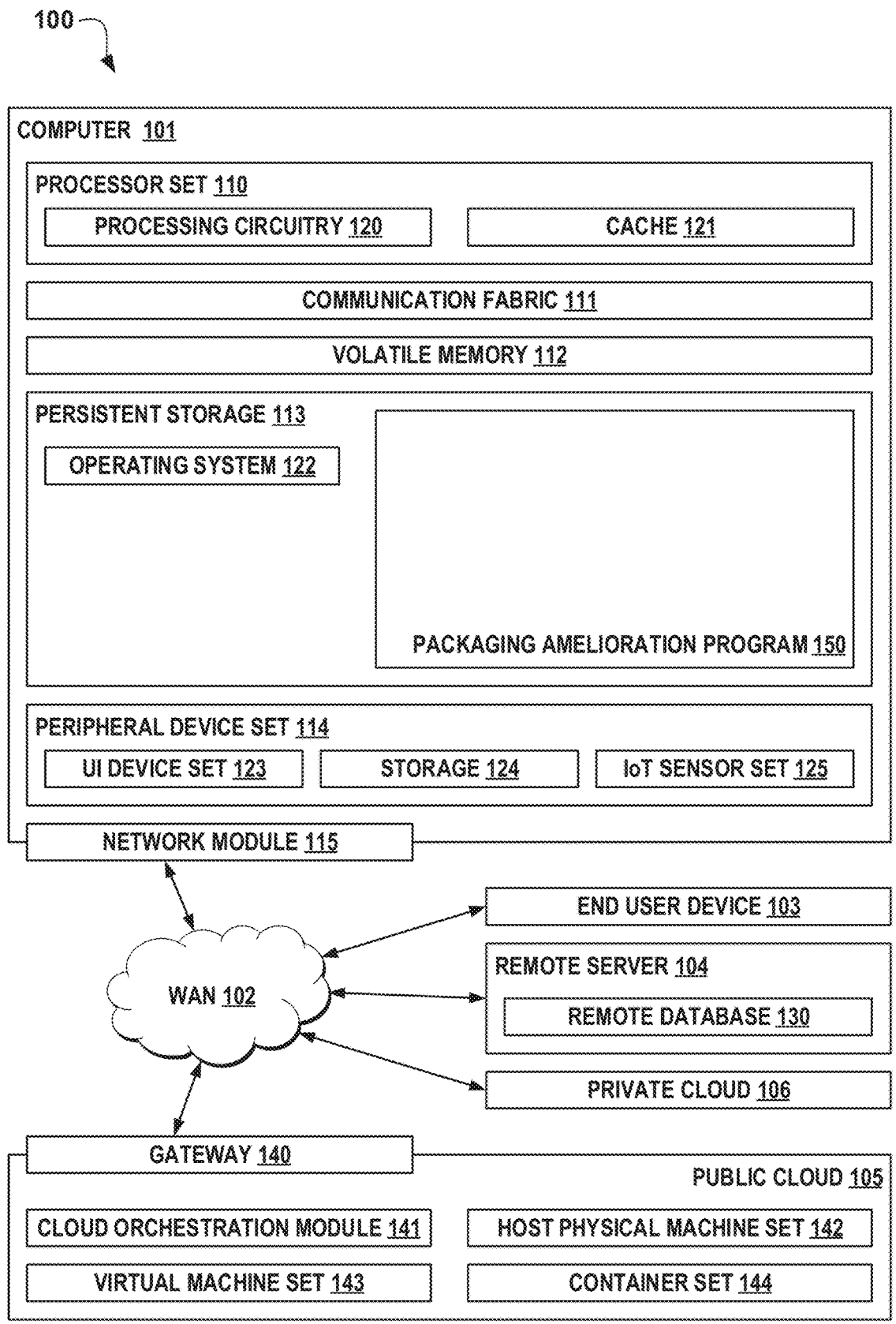
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for ameliorating reusable packaging for cognitive commerce shipments. The following described exemplary embodiments provide a system, method, and program product to, among other things, identify a required level of inflation of an array of balloons in a reusable package based on information relating to a product and historical sensor data and, accordingly, inflating a plurality of balloons in the array of balloons consistent with the required level of inflation. Therefore, the present embodiment has the capacity to improve reusable packaging technology by dynamically creating a protective cocoon around a product to prevent vibrations and movement of the product in-transit.

As previously described, in the current marketplace, products are delivered with appropriate packages. For example, a larger product may require a larger box than a box required for a smaller product. These products may be delivered by trucks, vans, ships, trains, and/or airplanes. Many of these products may be delivered in reusable packages, where the reusable packages are collected after the products have been delivered. Alternatively, the recipient may reuse the delivered package to either return an unwanted or defective product or ship a completely different product. As technology continues to improve and give consumers the ability to have products shipped to their homes at the click of a button, the demand for reusable packages is expected to increase in the coming decades. The products to be delivered may have varying shapes and dimensions, and thus a reusable package that is appropriate for one product may not be appropriate for a different product. This problem is typically addressed by statically defining inflation protection for packaging. However, this type of inflation protection fails to dynamically adjust inflation in-transit and inflate balloons based on the analysis of the product to be shipped.

It may therefore be imperative to have a system in place to dynamically adjust inflation in-transit and inflate balloons based on the analysis of the product to be shipped. Thus, embodiments of the present invention may provide advantages including, but not limited to, dynamically creating a protective cocoon around a product to prevent vibrations and movement of the product in-transit, controlling inflation based on the dimensions of the product and available space in a reusable package, and preventing damage to the product. The present invention does not require that all advantages need to be incorporated into every embodiment of the invention.

According to at least one embodiment, when packaging products, information relating to a product to be shipped in a reusable package and historical data obtained from a knowledge corpus may be received in order to predict a size of the reusable package in which to ship the product based on the information. Upon predicting the size of the reusable package, a required level of inflation of an array of balloons in the reusable package may be identified based on the information and the historical sensor data so that a plurality of balloons in the array of balloons may be inflated consistent with the required level of inflation. According to at least one embodiment, in response to determining the product does not require additional protection while in transit to a final destination based on real-time feedback from a plurality of sensors in the reusable package, each inflated balloon in the array of balloons may be deflated upon delivery of the product to the final destination.

According to at least one other embodiment, in response to determining the product does require the additional protection, a gas may be generated by mixing a plurality of chemicals together in an isolated chamber in the reusable package such that at least one balloon that lost air while in-transit to the final destination may be reinflated with the generated gas. Then, each inflated balloon in the array of balloons may be deflated upon the delivery of the product to the final destination.

The present invention may be a system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a required level of inflation of an array of balloons in a reusable package based on information relating to a product and historical sensor data and, accordingly, inflating a plurality of balloons in the array of balloons consistent with the required level of inflation.

Referring to FIG. 1, an exemplary computing environment 100 is depicted, according to at least one embodiment. Computing environment 100 contains an example of an environment for the execution of at least some of the computer code involved in performing the inventive methods, such as a packaging amelioration program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a camera, an array of inflatable balloons, an inflation mechanism, a pressure sensor, a vibration sensor, a sound sensor, and/or a light sensor.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the packaging amelioration program 150 may be a program capable of receiving information relating to a product to be shipped in a reusable package and historical sensor data, identifying a required level of inflation of an array of balloons in the reusable package based on the information relating to the product and the historical sensor data, inflating a plurality of balloons in the array of balloons consistent with the required level of inflation, dynamically creating a protective cocoon around the product to prevent vibrations and movement of the product in-transit, controlling inflation based on the dimensions of the product and available space in the reusable package, and preventing damage to the product. Furthermore, notwithstanding depiction in computer 101, the packaging amelioration program 150 may be stored in and/or executed by, individually or in any combination, end user device 103, remote server 104, public cloud 105, and private cloud 106. The packaging amelioration method is explained in further detail below with respect to FIG. 2. It may be appreciated that the examples described below are not intended to be limiting, and that in embodiments of the present invention the parameters used in the examples may be different.

Figure 2:
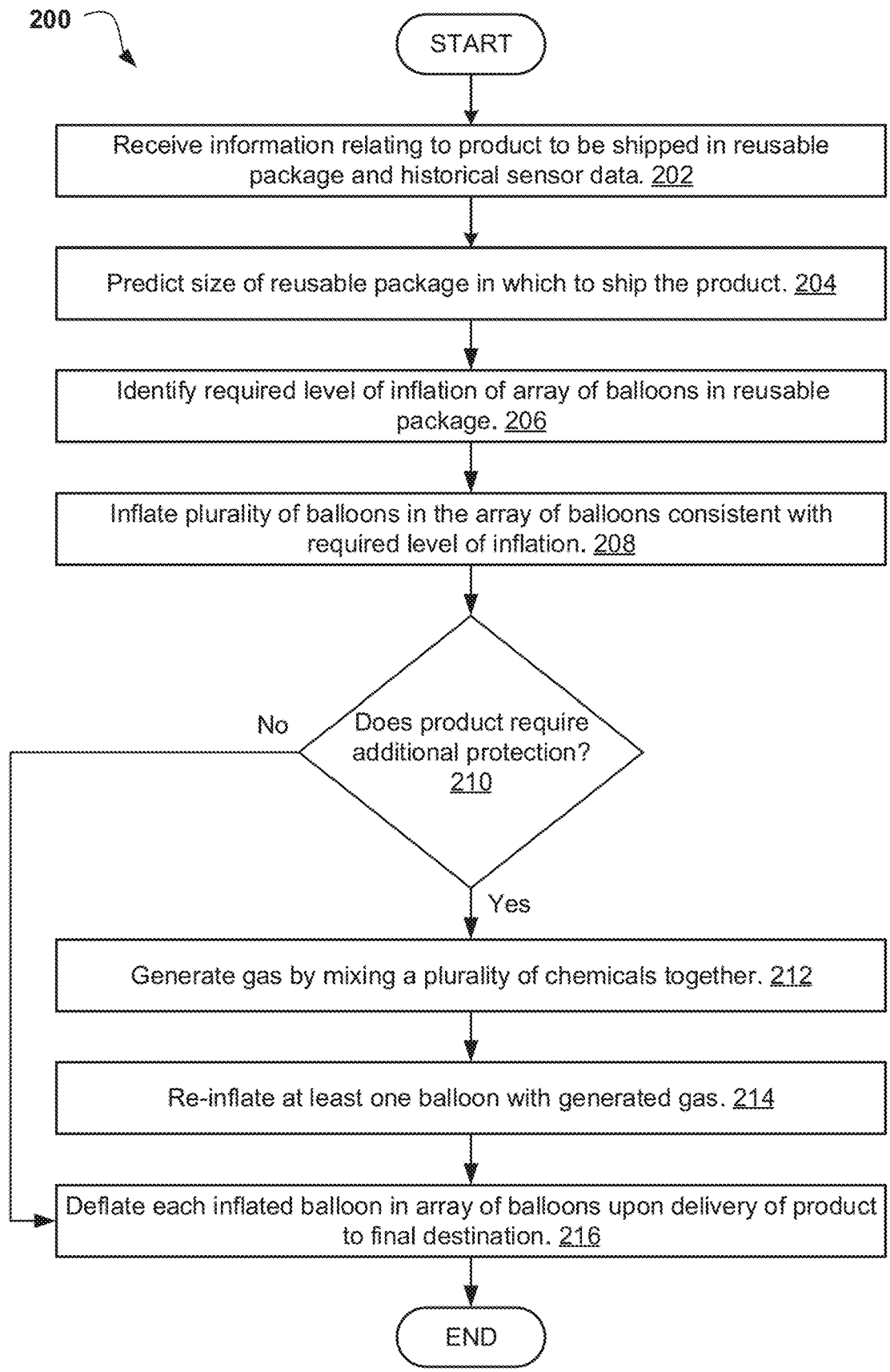
FIG. 2 illustrates an operational flowchart for ameliorating reusable packaging for cognitive commerce shipments in a reusable packaging amelioration process according to at least one embodiment.

Referring now to FIG. 2, an operational flowchart for ameliorating reusable packaging for cognitive commerce shipments in a reusable packaging amelioration process 200 is depicted according to at least one embodiment. At 202, the packaging amelioration program 150 receives the information relating to the product to be shipped in the reusable package and the historical sensor data obtained from the knowledge corpus.

The information relating to the product may include, but is not limited to, a shape of the product, a weight of the product, dimensions of the product (e.g., length, width, and height), a transportation mode of the product (e.g., truck, van, ship, train, and/or airplane), and/or a transportation time of the product. For example, the weight of the product may be 20 pounds, the shape may be a rectangle, and the dimensions may be 2 feet in length, 2 feet in width, and 1 foot in height. In another example, the transportation mode of the product may be by truck and the transportation time may be 48 hours.

According to at least one embodiment, a camera may capture the product being loaded into the reusable package and the packaging amelioration program 150 may use computer vision techniques to identify the product. For example, the product may be several coffee mugs in a box, illustrated in FIG. 3. In this embodiment, the computer vision techniques may also be used to determine the shape of the product and the dimensions. The weight of the product may then be inferred from the identification of the product along with the weight and the dimensions. Continuing the example, the total weight of the coffee mugs may be 5 pounds.

According to at least one other embodiment, a user may manually specify the product being loaded into the reusable package via a graphical user interface (GUI) on the end user device 103. For example, the user may specify that the product being loaded into the reusable package is the several coffee mugs in the box, illustrated in FIG. 3. In this embodiment, the user may also specify the additional information relating to the product described above. For example, the user may specify that the shape and the dimensions. In either of the above described embodiments, the user may specify the transportation mode and the transportation time. For example, the user may specify that the product is to be shipped by truck with an estimated transportation time of 48 hours.

The historical sensor data may include, but is not limited to, historical pressure and a number of balloons inflated of the array of balloons during a previous shipment, historical rates of deflation of the plurality of balloons, and/or historical vibrations and movements of the product in the reusable package. The historical sensor data may be stored in the knowledge corpus. In embodiments of the present invention, the information described above that is received in real-time may also become historical data after moving the information to the knowledge corpus. Thus, the information and the historical sensor data may be contained in the knowledge corpus, which may be accessed by the packaging amelioration program 150.

Then, at 204, the packaging amelioration program 150 predicts the size of the reusable package in which to ship the product. The size is predicted based on the information relating to the product. For example, the shape of the product and the dimensions of the product may be indicative of the predicted size of the reusable package. Continuing the example, where the dimensions of the product are 2 feet in length, 2 feet in width, and 1 foot in height, the predicted size may be a reusable package with dimensions larger than 2 feet in length, 2 feet in width, and 1 foot in height. In another example, the weight of the product may also be indicative of the predicted size of the reusable package. Continuing the example, a heavier product may require a larger reusable package than a lighter product. In yet another example, the transportation mode may further be indicative of the predicted size of the reusable package. Continuing the example, since a ship may be larger than a truck, the available space on the truck may be significantly less than the space available on the ship. Thus, to conserve space, the reusable package for a product to be shipped on the truck may be smaller than the reusable package for a product to be shipped on the ship. In any of the embodiments described above, the predicted size of the reusable package may be added to the knowledge corpus.

Next, at 206, the packaging amelioration program 150 identifies the required level of inflation of the array of balloons in the reusable package. The required level of inflation is identified based on the information and the historical sensor data. The array of balloons may be attached to each sidewall of the reusable package, illustrated in FIG. 3. The array of balloons may be arranged with appropriate spacing to prevent one balloon from interfering with another adjacent balloon when inflated.

According to at least one embodiment, the required level of inflation of the array of balloons may be enough pressure for the plurality of balloons to be in contact with the product. For example, the information considered by the packaging amelioration program 150 to identify the required level of inflation of the array of balloons may include the shape of the product and the dimensions of the product, along with the size of the reusable package, and the historical sensor data considered may be the historical pressure and the number of balloons inflated of the array of balloons during a previous shipment. Continuing the example, assume the product is in the shape of a rectangle and the dimensions of the product are 2 feet in length, 2 feet in width, and 1 foot in height, and the size of the reusable package is 3 feet in length, 3 feet in width, and 2 feet in height. Continuing the example, assume the historical sensor data included a total of 4 balloons inflated, where at least one balloon on opposite sidewalls were inflated 1 foot along the length of the package, and at least one balloon on opposite sidewalls 1 foot along the width of the package. In this example, the required level of inflation of the array of balloons may be to inflate at least one balloon on opposite sidewalls 1 foot along the length of the package, and at least one balloon on opposite sidewalls 1 foot along the width of the package.

In another example, the information considered by the packaging amelioration program 150 to identify the required level of inflation of the array of balloons may also include the transportation mode of the product and the transportation time of the product and the historical sensor data considered may also be the historical rates of deflation of the plurality of balloons, and the historical vibrations and movements of the product in the reusable package during the previous shipment. Continuing the example, assume the transportation mode of the product is by truck and the transportation time is 48 hours. Continuing the example, assume the historical sensor data included each inflated balloon deflated at a rate of 0.2 inches per hour when shipped by truck and the product shifted in the reusable package during deflation. In this example, the required level of inflation may be to add more pressure to the balloons than in the example described above to offset the rate of deflation and movement of the product.

Figure 4:
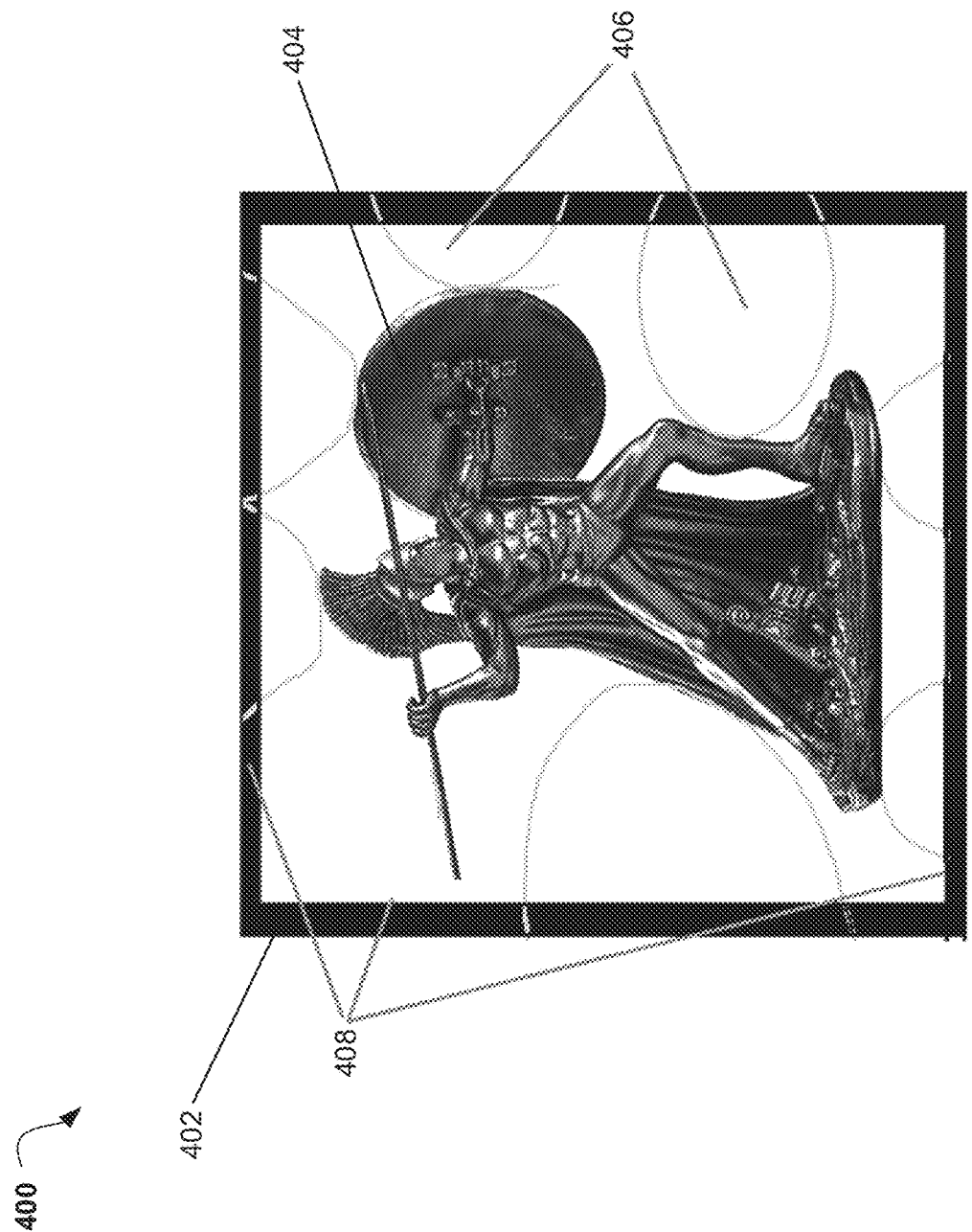
FIG. 4 is a diagram depicting an operational example of the array of balloons in FIG. 3 selectively protecting portions of a product according to at least one embodiment.

According to at least one other embodiment, the required level of inflation of the array of balloons may be enough pressure for the plurality of balloons to be in contact with only one or more non-sensitive portions of the product, illustrated in FIG. 4. In this embodiment, the packaging amelioration program 150 may first identify one or more sensitive portions of the product and the one or more non-sensitive portions of the product. A sensitive portion of the product may be a sharp edge of the product and/or a fragile part of the product, described in further detail below with respect to the description of FIG. 4. The one or more sensitive portions may be identified based on the identification of the product as well as the shape and the dimensions of the product. For example, where the product is a desk with a metal base and a glass top, the sensitive portion of the desk may be the glass top. A non-sensitive portion of the product may be any portion of the product that is not classified as sensitive. Based on the one or more sensitive portions and the one or more non-sensitive portions, the required level of inflation of the array of balloons may be the same as that in the embodiment described above for those balloons in contact with the one or more non-sensitive portions of the product, and no inflation for those balloons that would be in contact with the one or more sensitive portions of the product, illustrated in FIG. 4.

Then, at 208, the packaging amelioration program 150 inflates the plurality of balloons in the array of balloons. The plurality of balloons are inflated consistent with the required level of inflation upon detecting the product in the reusable package. The reusable package may be equipped with an inflation mechanism, such as an air flow circuit and a valve for each balloon in the array of balloons. According to at least one embodiment, the inflation mechanism may be configured to automatically inflate the plurality of balloons upon detecting the product in the reusable package. In this embodiment, the sound sensor and/or the light sensor in the reusable package may be used to detect that the product is in the reusable package and therefore inflation should commence. For example, after the product is placed into the reusable package, the reusable package may be closed, and the light sensor may determine it is dark inside the reusable package. Similarly, for example, the reusable package may be sealed with tape after being closed, and the sound sensor may detect the sound of the tape stretching across the reusable package. According to at least one other embodiment, the inflation mechanism may be activated manually by the user. For example, the inflation mechanism may be activated by a switch or button on an exterior of the reusable package and/or activated on the GUI of the end user device 103.

According to the at least one embodiment where the required level of inflation of the array of balloons is enough pressure for the plurality of balloons to be in contact with the product, the packaging amelioration program 150 may inflate the plurality of balloons to the required level. For example, where the required level of inflation of the plurality of balloons is to inflate at least one balloon on opposite sidewalls 1 foot along the length of the package, and at least one balloon on opposite sidewalls 1 foot along the width of the package, the inflation mechanism may inflate the plurality of balloons to such level.

According to the at least one other embodiment where the required level of inflation of the array of balloons is enough pressure for the plurality of balloons to be in contact with only one or more non-sensitive portions of the product, the packaging amelioration program 150 may inflate only the plurality of balloons that would be in contact with the one or more non-sensitive portions of the product. In this embodiment, the remaining balloons that would be in contact with the one or more sensitive portions of the product may not be inflated. For example, where the product is a desk with a metal base and a glass top, and where the sensitive portion of the desk is the glass top, the inflation mechanism may inflate only the plurality of balloons that would be in contact with the metal base without inflating the remaining balloons that would be in contact with the glass top.

According to at least one further embodiment, the reusable package may include a plurality of zones, where each sidewall of the reusable package may be comprised of at least two zones, illustrated in FIG. 3 and described in further detail below with respect to the description of FIG. 3. In this embodiment, at least one balloon may be inflated in each zone of the plurality of zones. Therefore, at least two balloons (i.e., one balloon in each zone) may be inflated on each sidewall of the reusable package.

Next, at 210, the packaging amelioration program 150 determines whether the product requires the additional protection while in-transit to the final destination. The determination is made based on the real-time feedback from the plurality of sensors in the reusable package. As described above, the peripheral device set 114 includes a plurality of pressure sensors and a plurality of vibration sensors. The real-time feedback may include a rate of deflation of each inflated balloon as monitored by the plurality of pressure sensors in the reusable package. For example, the plurality of pressure sensors may detect that one or more of the inflated balloons is deflating at a rate of 0.5 inches every two hours. The real-time feedback may also include a vibration pattern of the product as monitored by the plurality of vibration sensors in the reusable package. For example, the plurality of vibration sensors may detect the product is vibrating due to the one or more balloons deflating. Thus, when the one or more balloons deflate and the product vibrates as a result, the product may be determined to require the additional protection. The knowledge corpus may be updated to include the real-time feedback. Accordingly, the data received in real-time from the plurality of pressure sensors and the plurality of pressure sensors may also become historical data after moving the data to the knowledge corpus.

In response to determining the product requires the additional protection (step 210, "Yes" branch), the reusable packaging amelioration process 200 proceeds to step 212 to generate the gas by mixing the plurality of chemicals together in the isolated chamber in the reusable package. In response to determining the product does not require the additional protection (step 210, "No" branch), the reusable packaging amelioration process 200 proceeds to step 216 to deflate each inflated balloon in the array of balloons upon delivery of the product to the final destination.

Then, at 212, the packaging amelioration program 150 generates the gas by mixing the plurality of chemicals together in the isolated chamber in the reusable package. While the product is in-transit, the air flow circuit may not be available to inflate the plurality of balloons. Therefore, the inflation mechanism may also include the chemical storage chamber which contains the chemicals. Examples of the gas generated by mixing the chemicals include, but are not limited to, helium, hydrogen, nitrous oxide, and/or oxygen. When the product is vibrating in the reusable package or the one or more balloons deflate, the packaging amelioration program 150 may initiate the mixing of the chemicals by turning on a battery to trigger the inflation mechanism.

Next, at 214, the packaging amelioration program 150 reinflates the at least one balloon that lost air while in-transit to the final destination. The at least one balloon may be reinflated with the generated gas. In addition to triggering the inflation mechanism, the battery may also force the generated gas into an opening of the at least one balloon that lost air. The at least one balloon that lost air may be reinflated to the required level of inflation. For example, where the at least one balloon has deflated 0.5 inches, the at least one balloon may be fed with enough generated gas to reinflate the balloon 0.5 inches.

Then, at 216, the packaging amelioration program 150 deflates each inflated balloon in the array of balloons. Each inflated balloon may be deflated upon delivery of the product to the final destination. According to at least one embodiment, the inflation mechanism may be configured to automatically deflate each inflated balloon upon detecting the product has been delivered to the final destination. In this embodiment, the sound sensor and/or the light sensor in the reusable package may be used to detect that the product has been delivered and therefore deflation should commence. For example, after the product is delivered, the reusable package may be opened, and the light sensor may detect light inside the reusable package. Similarly, for example, the tape may be torn off the reusable package before being opened, and the sound sensor may detect the sound of the tape being torn off the reusable package. According to at least one other embodiment, the deflation of each inflated balloon may be activated manually by the user. For example, the deflation may be activated by the switch or button on the exterior of the reusable package and/or activated on the GUI of the end user device 103.

Figure 3:
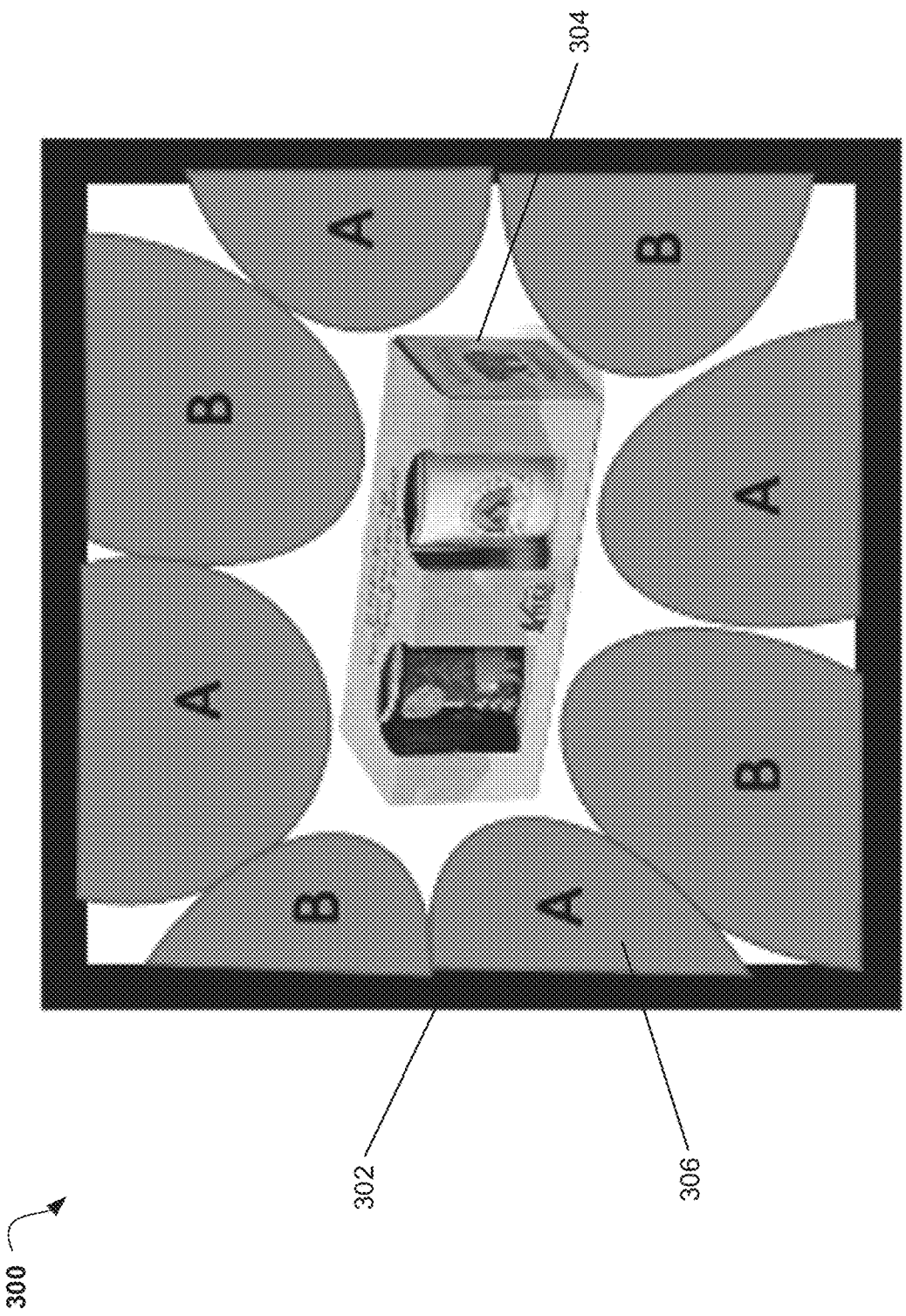
FIG. 3 is a diagram depicting an operational example of an array of balloons protecting a product according to at least one embodiment.

Referring now to FIG. 3, a diagram 300 depicting an operational example of an array of balloons 306 protecting a product 304 is shown according to at least one embodiment. In the diagram 300, the reusable package 302 may include a plurality of zones, where each sidewall of the reusable package 302 may be comprised of at least two zones A, B. The reusable package 302 may contain the product 304. For example, the product 304 may be several coffee mugs in a box. In this embodiment, at least one balloon 306 may be inflated in each zone A, B of the plurality of zones. Therefore, at least two balloons 306 (i.e., one in each zone A, B) may be inflated on each sidewall of the reusable package 302. In this manner, the product 304 may still receive some protection if one of the balloons 306 is punctured. For example, if each balloon 306 in zone A is punctured, the remaining balloons 306 in zone B may still offer some protection to the product 304.

Referring now to FIG. 4, a diagram 400 depicting an operational example of the array of balloons 306 in FIG. 3 selectively protecting portions of a product 404 is shown according to at least one embodiment. In the diagram 400, the reusable package 402 may contain the product 404. For example, the product 404 may be a statue, where the product 404 may be comprised of the one or more sensitive portions and the one or more non-sensitive portions. As described above with respect to the description of FIG. 2, the one or more sensitive portions of the product 404 may be a sharp edge of the product 404 and/or a fragile part of the product 404. For example, when the product 404 is the statue, the one or more sensitive portions of the statue may be the spear and/or rounded portions of the base. Also, as described above with respect to the description of FIG. 2, the one or more non-sensitive portions of the product 404 may be those portions not classified as the one or more sensitive portions of the product 404. The array of balloons 306 in FIG. 3 may include a first array of balloons 406 and a second array of balloons 408. The first array of balloons 406 may be inflated to be in contact with the one or more non-sensitive portions of the product. On the other hand, the second array of balloons 408 may not be inflated, and therefore are not in contact with the one or more sensitive portions of the product 404.

It may be appreciated that FIGS. 2, 3, and 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of ameliorating reusable packaging for cognitive commerce shipments, the method comprising:
   receiving information relating to a product to be shipped in a reusable package and historical sensor data obtained from a knowledge corpus;
   predicting a size of the reusable package in which to ship the product based on the information;
   identifying a required level of inflation of an array of balloons in the reusable package based on the information and the historical sensor data;
   inflating a plurality of balloons in the array of balloons consistent with the required level of inflation; and
   deflating each inflated balloon in the array of balloons upon delivery of the product to a final destination.

2. The computer-based method of claim 1, further comprising:
   determining whether the product requires additional protection while in-transit to a final destination based on real-time feedback from a plurality of sensors in the reusable package; and
   in response to determining the product does require the additional protection:
      generating a gas by mixing a plurality of chemicals together in an isolated chamber in the reusable package.

3. The computer-based method of claim 2, further comprising:
reinflating at least one balloon that lost air while in-transit to the final destination with the generated gas.

4. The computer-based method of claim 1, wherein the knowledge corpus is updated to include the real-time feedback.

5. The computer-based method of claim 1, wherein inflating the plurality of balloons in the array of balloons further comprises:
inflating at least one balloon in each zone of a plurality of zones, wherein each sidewall of the reusable package is comprised of at least two zones.

6. The computer-based method of claim 1, wherein identifying the required level of inflation of the array of balloons further comprises:
identifying one or more sensitive portions of the product and one or more non-sensitive portions of the product, wherein the plurality of balloons are inflated to be in contact with the one or more non-sensitive portions of the product.

7. The computer-based method of claim 1, wherein the information relating to the product is selected from a group consisting of a shape of the product, a weight of the product, dimensions of the product, a transportation mode of the product, and a transportation time of the product.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving information relating to a product to be shipped in a reusable package and historical sensor data obtained from a knowledge corpus;
predicting a size of the reusable package in which to ship the product based on the information;
identifying a required level of inflation of an array of balloons in the reusable package based on the information and the historical sensor data;
inflating a plurality of balloons in the array of balloons consistent with the required level of inflation; and
deflating each inflated balloon in the array of balloons upon delivery of the product to a final destination.

9. The computer system of claim 8, the method further comprising:
determining whether the product requires additional protection while in-transit to a final destination based on real-time feedback from a plurality of sensors in the reusable package; and
in response to determining the product does require the additional protection:
generating a gas by mixing a plurality of chemicals together in an isolated chamber in the reusable package.

10. The computer system of claim 9, the method further comprising:
reinflating at least one balloon that lost air while in-transit to the final destination with the generated gas.

11. The computer system of claim 8, wherein the knowledge corpus is updated to include the real-time feedback.

12. The computer system of claim 8, wherein inflating the plurality of balloons in the array of balloons further comprises:
inflating at least one balloon in each zone of a plurality of zones, wherein each sidewall of the reusable package is comprised of at least two zones.

13. The computer system of claim 8, wherein identifying the required level of inflation of the array of balloons further comprises:
identifying one or more sensitive portions of the product and one or more non-sensitive portions of the product, wherein the plurality of balloons are inflated to be in contact with the one or more non-sensitive portions of the product.

14. The computer system of claim 8, wherein the information relating to the product is selected from a group consisting of a shape of the product, a weight of the product, dimensions of the product, a transportation mode of the product, and a transportation time of the product.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving information relating to a product to be shipped in a reusable package and historical sensor data obtained from a knowledge corpus;
predicting a size of the reusable package in which to ship the product based on the information;
identifying a required level of inflation of an array of balloons in the reusable package based on the information and the historical sensor data;
inflating a plurality of balloons in the array of balloons consistent with the required level of inflation; and
deflating each inflated balloon in the array of balloons upon delivery of the product to a final destination.

16. The computer program product of claim 15, the method further comprising:
determining whether the product requires additional protection while in-transit to a final destination based on real-time feedback from a plurality of sensors in the reusable package; and
in response to determining the product does require the additional protection:
generating a gas by mixing a plurality of chemicals together in an isolated chamber in the reusable package.

17. The computer program product of claim 16, the method further comprising:
reinflating at least one balloon that lost air while in-transit to the final destination with the generated gas.

18. The computer program product of claim 15, wherein the knowledge corpus is updated to include the real-time feedback.

19. The computer program product of claim 15, wherein inflating the plurality of balloons in the array of balloons further comprises:
inflating at least one balloon in each zone of a plurality of zones, wherein each sidewall of the reusable package is comprised of at least two zones.

20. The computer program product of claim 15, wherein identifying the required level of inflation of the array of balloons further comprises:

identifying one or more sensitive portions of the product and one or more non-sensitive portions of the product, wherein the plurality of balloons are inflated to be in contact with the one or more non-sensitive portions of the product.

* * * * *